2 Sheets—Sheet 1.

R. F. BURNS.

MACHINE FOR POLISHING THE EDGES OF BOOT AND SHOE SOLES.

No. 7,101. Reissued May 9, 1876.

Witnesses:
Wm. F. Sampson
Newton S. Otis.

Inventor:
Robert F. Burns.
By A. L. Munson
Atty

N. PETERS, PHOTO-LITHOGRAPHER, WASHINGTON, D. C.

R. F. BURNS.

MACHINE FOR POLISHING THE EDGES OF BOOT AND SHOE SOLES.

No. 7,101. Reissued May 9, 1876.

Witnesses:
Wm. S. Sampson
Newton S. Otis.

Inventor.
Robert F. Burns.
By A. L. Munson
Attorney.

N. PETERS, PHOTO-LITHOGRAPHER, WASHINGTON, D. C.

UNITED STATES PATENT OFFICE.

ROBERT F. BURNS, OF ALBANY, NEW YORK, ASSIGNOR, BY MESNE ASSIGNMENTS, TO THE BURNS MACHINE COMPANY, OF NEW YORK CITY.

IMPROVEMENT IN MACHINES FOR POLISHING THE EDGES OF BOOT AND SHOE SOLES.

Specification forming part of Letters Patent No. 97,758, dated December 14, 1869; reissue No. 7,101, dated May 9, 1876; application filed February 4, 1875.

*To all whom it may concern:*

Be it known that I, ROBERT F. BURNS, of the city and county of Albany and State of New York, have invented a Machine for Burnishing or Polishing the Sole-Edges of Boots and Shoes, of which the following is a specification:

The object of my invention is to provide an organized and fully-equipped machine for the purpose of systematically and rapidly burnishing and polishing the sole-edges of boots and shoes. These processes are now generally performed by manual labor, are very severe and laborious to the operator, and relatively slow, when it is considered that the majority of the other operations and manipulations in the manufacture of boots and shoes are performed by the aid of machinery.

By the use of a machine organized and constructed on my plan, the edges of the soles can be very quickly burnished and polished, with but little expense in time, a corresponding diminution in labor, and with a great uniformity in appearance.

Figure 1:
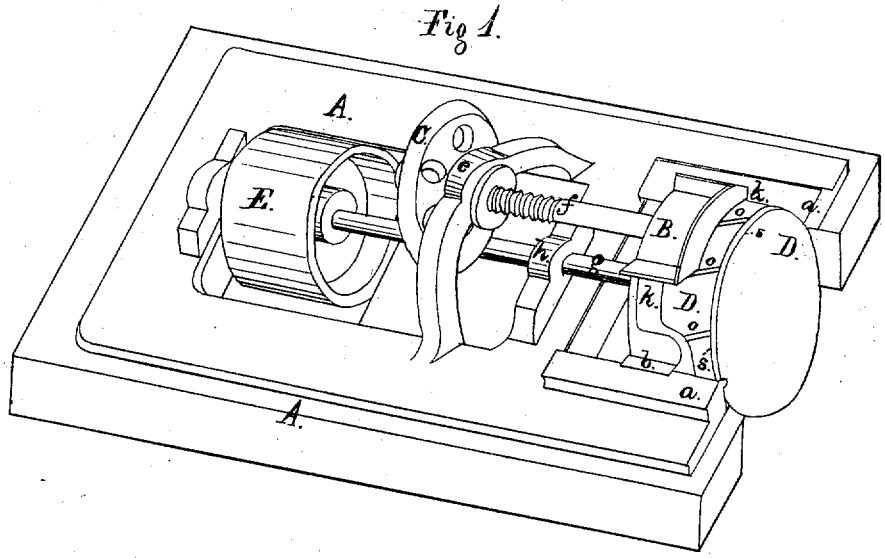
Figure 2:
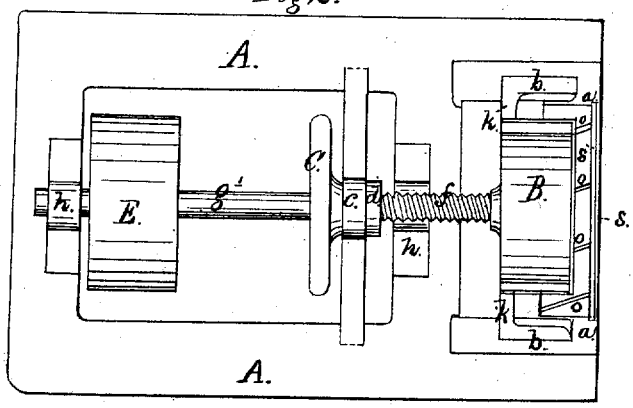
Figure 4:
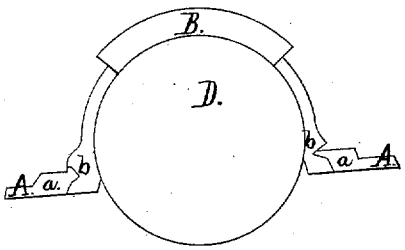
Figure 5:
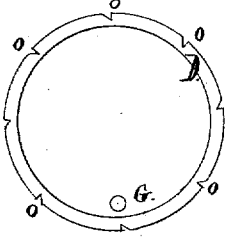
Figure 3:
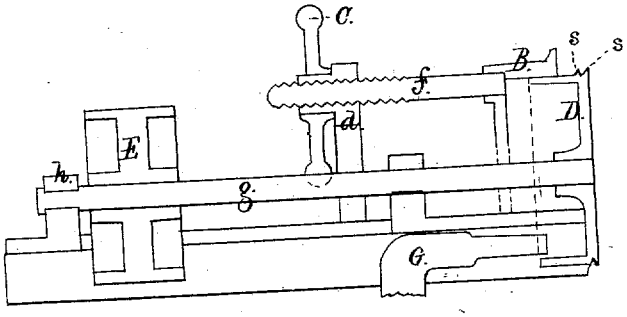

In the drawings which form a part of this specification, Figure 1 is a perspective view of the machine. Fig. 2 is a plan view of the same. Fig. 3 is a longitudinal vertical section of the same. Fig. 4 is a front view of the adjustable gage and face of the burnishing-cylinder; and Fig. 5 is a cross-section of the burnishing-cylinder, taken on line *x x* in Figs. 2 and 3.

Similar letters of reference indicate corresponding parts.

My invention consists, first, in providing, in combination with an adjustable gage, having screw-shank and operating-wheel, a burnishing or polishing cylinder, the periphery of which is cut corrugated, channeled, grooved, or recessed, for the purpose of polishing the surface of the sole-edges by means of a rapid and continuous succession of blows, in lieu of using a cylinder whose surface is smooth. These corrugations, channels, grooves, or recesses also serve to receive and carry off any gummy matter that may exude from the leather and accumulate during the process of polishing. Second, in providing an adjustable gage, having screw-shank and operating-wheel, by means of which any required thickness of sole can be evenly presented to the action of the burnishing-cylinder, all of which processes will be fully described.

A, in Figs. 1, 2, and 3, represent any suitable form of a frame or bed, to which the various and operating parts of the machine are attached. D is the burnishing or polishing cylinder, and it may be made from iron, steel, or other suitable metal. It has cast, cut, or otherwise formed on its periphery the corrugations, grooves, or recesses *o o*, as shown plainly in Figs. 1, 2, and 5.

The function and operation of a burnishing-cylinder formed as above described are such that it accomplishes the work of polishing by a continuous succession of blows, this proving to be the most effectual method of polishing. The channels, grooves, or recesses *o o* may be as near together as practice may prove necessary for their perfect operation, and they may be formed at any given or desired line of direction with relation to the axis of the burnishing-cylinder. The burnishing-cylinder D is attached to and operated by means of a shaft, *g*, running in proper bearings *h h*, and receives its rotary motion from a pulley, E, which pulley is driven by a belt from any suitable counter-shaft arranged above or below the machine. The face of the burnishing-cylinder D, in the present instance, is made a part of it, and has its face edge cut and shaped into creasing or beading projections or lips *s s*, as seen plainly in Figs. 1 and 3. This is for the purpose of creasing or molding a bead on the edges of the soles at or near the upper. This creasing or molding, in some cases, requires a greater and more effective action of the tool; and as it is desirable that the molding be finished at the same time that the polishing is done, I therefore cause the projecting lips *s s* to be heated to a higher degree of temperature than the periphery of the burnishing-cylinder D. For this reason I have constructed said cylinder with a solid face, connecting with and solid to the said periphery of the cylinder, and have placed the said projecting creasing-lips *s s* directly over the intersection of the angles of the face and said polishing periphery. B is an adjustable gage extending over the burnishing-cylinder D. It has on its sides the female guides *b b*, into which the male guiding-pieces *a a*, which are attached to the bed of the machine, work. *c* is a standard or bearing, holding a revolving nut, *d*, which nut is keyed or otherwise fastened to a hand-wheel, C. *f* is a screw fastened at one end to the top of the adjustable gage B, while the other end works into the revolving nut *d*. This gage B operates over the burnishing-cylinder D, and the operator is enabled to apply the boot or shoe above the cylinder in such manner as may best suit his purpose. Two notches or recesses, *k k*, are made into the adjustable gage, for the purpose of acting as stops or holding lips for the heel of the boot or shoe which is to be operated upon.

In some cases it is found desirable to use heat in connection with a burnishing-machine. For that purpose a jet of gas or other flame, G, is used within the cylinder D, and is thrown forward and impinges on the inside of the solid face, but not on the inside of the polishing periphery. By this arrangement the face is heated by direct contact of the flame, and is kept at a higher degree of temperature than the polishing-surface of the cylinder, which is heated only by the radiation of the heat from said flame G. The temperature of the polishing-surface proper is also somewhat reduced by its rapid rotary motion, which creates a current of air, and thereby cools its surface, while the face of the cylinder is not affected by the rotary motion. It consequently becomes hotter, and communicates its heat to the creasing or beading lips *s s*; this enables the molding to be properly performed at the same time the polishing is done.

I am aware that rotating cylinders heated by means of jets of gas-flame have been used; but it has been in connection with cylinders having smooth polishing-surfaces only, and not provided with the creasing or beading projections or lips *s s*, or other molding devices; and the flame used in those cases was not designed to give a varying temperature to the several portions of the burnishing-cylinder to produce varying results, but was intended to result in a single and only the one operation, while in my invention the edge is not only to be polished, but a bead is to be molded, which operations, when performed, require a varying temperature of the several parts, to operate at one and the same time to effect the several results.

The method of operating my improved machine is as follows: The operator first sets into position the adjustable gage B to correspond with the thickness of the sole which is to be operated upon. This he accomplishes by means of the hand-wheel C, the turning of which will cause the revolving nut *d* to so affect the screw *f* as will cause it to move the gage B forward toward, or retract it from, the cylinder D, as may be required. The operator then grasps the boot or shoe to be operated upon and holds it firmly, with the edge of the sole in contact with the periphery of the burnishing-cylinder D, and the bottom of the sole against the face of the gage B; then, commencing at one angle of the heel, which enters one of the notches *k k* on the adjustable gage B, carries the edge of the sole past the shank toward and around the toe, and thence on the opposite side to the opposite angle of the heel, which heel falls into the other notch *k* on the gage B.

I am aware that a burnishing-cylinder for polishing sole-edges of boots and shoes, and provided with channels or grooves, has been made and patented in England in 1866; but said cylinder was simply a cylinder alone, and was not used as any part of an organized machine. It was also without any provision for governing the width of the sole-edge presented to the action of the cylinder. In my invention I present an organized machine provided with an adjustable gage in addition to said cylinder. I therefore make no claim to such a cylinder unless embodied in an organized machine, as herein described, with the additional element of an adjustable gage.

I am also aware that hand-tools provided with creasing-lips have long been used for creasing and beading sole-edges. I only claim such a device when incorporated in a machine and combined with a polishing-cylinder and an adjustable gage, as hereinbefore described.

What I claim as new, and desire to secure by Letters Patent, is—

1. In an organized machine arranged and adapted for the burnishing and polishing of the sole-edges of boots and shoes, the adjustable gage B, arranged for governing the width of the sole-edges presented to the action of the polishing-cylinder D, operating by means of the hand-wheel C, screws *f*, or their equivalents, substantially as and for the purposes as herein shown and set forth.

2. In combination with the adjustable gage B, having screw-shank *f* and operating-wheel C, the burnishing-cylinder D, provided on its periphery with channels, grooves, or recesses *o o*, which are cut therein at any desired line of inclination with respect to its axis, the whole combined, arranged, and operating substantially as and for the purposes as herein shown and set forth.

3. In combination with the adjustable gage B, having screw shank *f* and operating-wheel C, the beading, creasing, or molding lips *s s*, formed on the circumference of the outer disk or face of the polishing-cylinder D, arranged and operating substantially as and for the purposes as herein shown and set forth.

4. The stops *k k*, formed or cut into, and in combination with, the adjustable gage B, substantially as and for the purposes as herein shown and set forth.

5. In combination with the burnishing-cylinder D, provided with the molding-lips *s s*, and grooves or recesses *o o*, and adjustable gage B, having screw-shank and operating-wheel, of the heating devices, as herein described.

ROBERT F. BURNS.

In presence of—
ALEX. SELKIRK,
WM. THOMPSON.